United States Patent
Felch

(10) Patent No.: US 9,063,754 B2
(45) Date of Patent: Jun. 23, 2015

(54) PROFILING AND OPTIMIZATION OF PROGRAM CODE/APPLICATION

(71) Applicant: Cognitive Electronics, Inc., Boston, MA (US)

(72) Inventor: Andrew C. Felch, Palo Alto, CA (US)

(*) Notice: Subject to any disclaimer, the term of this patent is extended or adjusted under 35 U.S.C. 154(b) by 0 days.

(21) Appl. No.: 14/209,676

(22) Filed: Mar. 13, 2014

(65) Prior Publication Data

US 2014/0282455 A1  Sep. 18, 2014

Related U.S. Application Data

(60) Provisional application No. 61/791,228, filed on Mar. 15, 2013.

(51) Int. Cl.
*G06F 9/44* (2006.01)
*G06F 9/45* (2006.01)
*G06F 9/24* (2006.01)

(52) U.S. Cl.
CPC .............. *G06F 8/4441* (2013.01); *G06F 9/24* (2013.01)

(58) Field of Classification Search
CPC .................................................... G06F 8/4441
USPC .................................. 717/136–161; 714/35
See application file for complete search history.

(56) References Cited

U.S. PATENT DOCUMENTS

| | | | |
|---|---|---|---|
| 5,307,495 A | 4/1994 | Seino et al. | |
| 5,411,824 A | 5/1995 | Vasudev et al. | |
| 5,588,152 A | 12/1996 | Dapp et al. | |
| 5,590,345 A | 12/1996 | Barker et al. | |
| 5,625,836 A | 4/1997 | Barker et al. | |
| 5,708,836 A | 1/1998 | Wilkinson et al. | |
| 5,710,938 A | 1/1998 | Dahl et al. | |
| 5,713,037 A | 1/1998 | Wilkinson et al. | |
| 5,717,943 A | 2/1998 | Barker et al. | |
| 5,717,944 A | 2/1998 | Wilkinson et al. | |
| 5,734,921 A | 3/1998 | Dapp et al. | |
| 5,752,067 A | 5/1998 | Wilkinson et al. | |
| 5,754,871 A | 5/1998 | Wilkinson et al. | |

(Continued)

FOREIGN PATENT DOCUMENTS

| | | | |
|---|---|---|---|
| EP | 1313029 A1 | 5/2003 | |
| WO | 9516239 A1 | 6/1995 | |

(Continued)

OTHER PUBLICATIONS

Simunic, T.; Benini, L.; De Micheli, G.; Hans, Mat, "Source code optimization and profiling of energy consumption in embedded systems," System Synthesis, 2000. Proceedings. The 13th International Symposium on, pp. 193-198, 2000.*

(Continued)

*Primary Examiner* — Satish Rampuria
(74) *Attorney, Agent, or Firm* — Wolf, Greenfield & Sacks, P.C.

(57) ABSTRACT

A system and associated methods are disclosed for profiling the execution of program code by a processor. The processor provides an instruction set with special profiling instructions for efficiently determining the bounds and latency of memory operations for blocks of program code. Information gathered regarding the bounds and latency of memory operations are used to determine code optimizations, such as allocation of memory for data structures in memory more local to the processor.

18 Claims, 15 Drawing Sheets

(56) References Cited

U.S. PATENT DOCUMENTS

| | | | |
|---|---|---|---|
| 5,761,523 | A | 6/1998 | Wilkinson et al. |
| 5,765,011 | A | 6/1998 | Wilkinson et al. |
| 5,794,059 | A | 8/1998 | Barker et al. |
| 5,870,619 | A | 2/1999 | Wilkinson et al. |
| 5,878,241 | A | 3/1999 | Wilkinson et al. |
| 5,963,745 | A | 10/1999 | Collins et al. |
| 5,963,746 | A | 10/1999 | Barker et al. |
| 5,966,528 | A | 10/1999 | Wilkinson et al. |
| 6,094,715 | A | 7/2000 | Wilkinson et al. |
| 6,249,906 | B1 * | 6/2001 | Levine et al. ............... 717/153 |
| 6,397,379 | B1 * | 5/2002 | Yates et al. ............... 717/140 |
| 6,754,802 | B1 | 6/2004 | Kirsch |
| 6,757,019 | B1 | 6/2004 | Hsieh et al. |
| 6,826,748 | B1 * | 11/2004 | Hohensee et al. ............ 717/130 |
| 6,941,545 | B1 * | 9/2005 | Reese et al. ............... 717/130 |
| 7,069,416 | B2 | 6/2006 | Kirsch |
| 7,111,290 | B1 * | 9/2006 | Yates et al. ............... 717/158 |
| 7,132,664 | B1 | 11/2006 | Crosetto |
| 7,159,082 | B1 | 1/2007 | Wade |
| 7,167,890 | B2 | 1/2007 | Lin et al. |
| 7,512,816 | B2 | 3/2009 | Ootsuka et al. |
| RE41,293 | E | 4/2010 | Drogichen et al. |
| 7,693,991 | B2 | 4/2010 | Greenlee et al. |
| 8,200,992 | B2 | 6/2012 | Felch et al. |
| 2003/0222879 | A1 | 12/2003 | Lin et al. |
| 2006/0261279 | A1 | 11/2006 | Crosetto |
| 2007/0083785 | A1 | 4/2007 | Sutardja |
| 2007/0094444 | A1 | 4/2007 | Sutardja |
| 2007/0226522 | A1 | 9/2007 | Aleksic et al. |
| 2008/0040563 | A1 | 2/2008 | Brittain et al. |
| 2008/0109796 | A1 * | 5/2008 | Kosche ............... 717/158 |
| 2008/0140921 | A1 | 6/2008 | Sutardja et al. |
| 2008/0184229 | A1 | 7/2008 | Rosu et al. |
| 2009/0083263 | A1 | 3/2009 | Felch et al. |
| 2009/0214040 | A1 | 8/2009 | Funk et al. |
| 2011/0138373 | A1 * | 6/2011 | Lane et al. ............... 717/157 |

FOREIGN PATENT DOCUMENTS

| | | |
|---|---|---|
| WO | 9963751 A1 | 12/1999 |
| WO | 03088033 A1 | 10/2003 |

OTHER PUBLICATIONS

Gupta, R.; Berson, D.A.; Fang, J.Z., "Resource-sensitive profile-directed data flow analysis for code optimization," Microarchitecture, 1997. Proceedings., Thirtieth Annual IEEE/ACM International Symposium on, pp. 358-368, Dec. 1-3, 1997.*

Kaneshiro, S.; Shindo, T., "Profiling optimized code: a profiling system for an HPF compiler," Parallel Processing Symposium, 1996., Proceedings of IPPS '96, The 10th International , pp. 469-473, Apr. 15-19, 1996.*

Cascaval et al, "Evaluation of a Multithreaded Architecture for Cellular Computing", 2002, pp. 1-11, Publisher: IEEE, Published in: US.

Grimm et al, "Parallel Volume Rendering on a single-chip SIMD Architecture", 2001, pp. 107-114, Publisher: IEEE, Published in: DE.

Birkland et al, "The Petacomp Machine a MIMD Cluster for Parallel Pattern Mining", 2006, pp. 1-10, Publisher: IEEE, Published in: NO.

Barroso et al, "Web Search for a Planet the Google Cluster Architecture", Mar. 2003, pp. 22-28, Publisher: IEEE, Published in: US.

Hennessy et al, "MultiThreading Using ILP Support to Exploit Thread Level Parallelism", 2007, pp. 172-179, Publisher: Computer Architecture, Published in: US.

Moore, Branden J., "Exploiting Large Shared On-Chip Caches for Chip Multiprocessors", Apr. 2005, pp. 1-69, Published in: US.

Olukotun et al, "Chip Multiprocessor Architecture", Nov. 28, 2007, pp. 1-47, Publisher: Morgan & Claypool, Published in: US.

Clabes, et al., "Design and Implementation of the POWERS5(TM) Microprocessor", "2004 IEEE International Conference on Integrated Circuit Design and Technology", May 17, 2004, pp. 143-145, Publisher: IEEE, Published in: US.

Elliot et al, "Computational RAM Implementing Processors in Memory", Mar. 1999, pp. 32-41, Publisher: IEEE, Published in: US.

Murakami et al, "Parallel Processing RAM Chip with 256Mb DRAM and Quad Processors", Feb. 1997, pp. 228-229, Publisher: IEEE, Published in: JP.

Office Action issued Sep. 6, 2012 in CN Application No. 200880117897.9.

Barroso et al, "Web Search for a Planet: The Google Cluster Architecture," IEEE Micro, vol. 23, No. 2, pp. 22-28 (Mar.-Apr. 2003).

Hennessy, "Computer Architecture: A Quantitative Approach. Chapter Three, Limits on Instruction-Level Parallelism," Fourth Ed., pp. 172-179 (Sep. 27, 2006).

Extended (Partial) European Search Report issued Feb. 12, 2013 in EP Application No. 12173452.9, 18 pages.

Cieslewicz et al, "Realizing Parallelism in Database Operations: Insights from a Massively Multithreaded Architecture," Proceedings of the Second International Workshop on Data Management on New Hardware (Jun. 25, 2006), 8 pages.

* cited by examiner

PROFILING AND OPTIMIZATION OF PROGRAM CODE/APPLICATION

CROSS-REFERENCE TO RELATED APPLICATION

This application claims the benefit of U.S. Provisional Application No. 61/791,228, filed Mar. 15, 2013.

FIELD OF THE INVENTION

This invention relates generally to profiling and optimization of program code. More specifically, the invention relates to a processor providing specialized profiling instructions that reduce that allow profiling with more representative execution of the non-profiling program code.

BACKGROUND OF THE INVENTION

The time required for execution of program code can be greatly impacted by the time required to perform memory operations. Over many repeated executions, small increases in the time required for particular memory operations can result in large increases in overall computation time.

Software profiling may be used to determine particular areas of a program that are consuming excess time or memory. However, modifying, or instrumenting, the software program code to provide such information can significantly alter the operation and behavior of the program, particularly in multi-threaded or parallel programs.

What is needed is a system for facilitating profiling of computer software that provides the benefits of software profiling, but still allows for representative operation of the program code.

SUMMARY OF THE INVENTION

A system and associated methods are disclosed for profiling the execution of program code by a processor. The processor provides an instruction set with special profiling instructions for efficiently determining the bounds and latency of memory operations for blocks of program code. Information gathered regarding the bounds and latency of memory operations are used to determine code optimizations, such as allocation of memory for data structures in memory more local to the processor.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

DETAILED DESCRIPTION OF THE INVENTION

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

Figure 1:
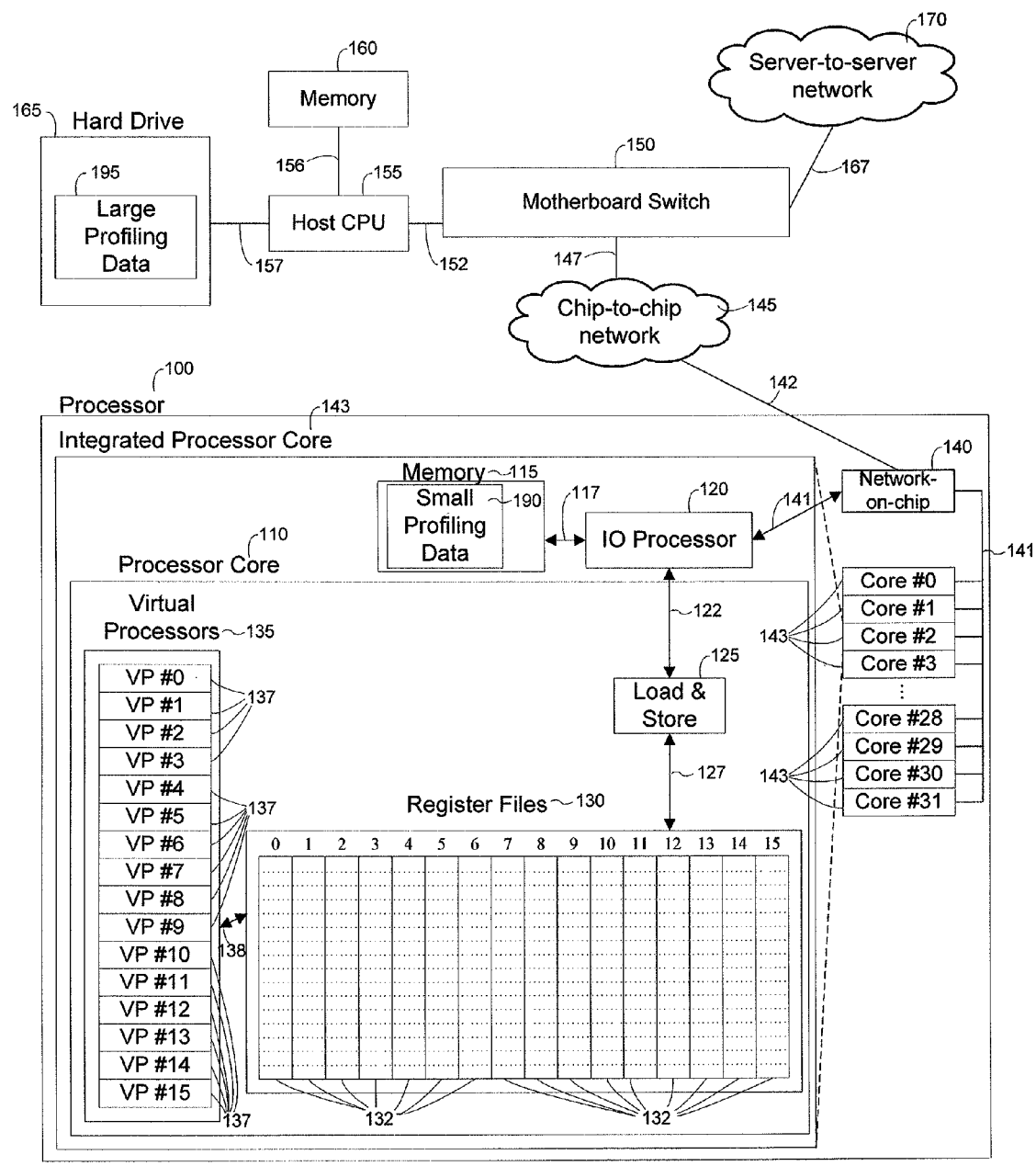
FIG. 1 is a simplified diagram of an organization of components in a system utilizing processors with special profiling instructions for profiling of program code.

FIG. 1 depicts an organization of Virtual Processors 135, Register Files 130, and other components along with Small Profiling Data 190 stored in Memory 115 and Large Profiling Data 195 stored in Host-attached Hard Drive 165. The Processor 100 includes a Network-on-chip 140 that connects to multiple Integrated Processor Cores 143 via link 141 to each Integrated Processor Core's 143 IO Processor 120. The IO Processor 120 connects the Processor Core 110, via link 122, the Memory 115, via link 117, and the Network-on-chip 140, via link 141, to each other.

The Memory 115 can hold the Small Profiling Data 190 that will help inform the compiler during future compilations. The Small Profiling Data 190 is eventually moved to the Host-attached Hard Drive 165 storage area for Large Profiling Data 195, where it can be stored more long term and aggregated in preparation for recompilation and analysis.

The Virtual Processors 135, comprising VP#0-VP #15 (137) in a preferred embodiment, connect to the Register Files 130 via link 138. The Register Files 130 include Register Files 0-15 (132), which correspond to VP #0-VP #15 (137) when running standard instructions.

The profiling system modifies the way in which the Virtual Processors 135 access the Register Files 130 using a custom instruction. The Register Files 130 connect to the Load & Store unit 125 and further connect to the IO Processor 120 through connections 127 and 122 respectively.

The Chip-to-chip network 145 connects to each Processor's 100 Network-on-chip 140 via links 142 and uplinks to the Motherboard Switch 150 via link 147. This pathway enables the Processor 100 to store data long term in the Host-attached Hard Drive 165. The Motherboard Switch 150 connects to the Host CPU 155 via link 152. The Host CPU 155 may be a standard processor such as an AMD Processor, and the Motherboard Switch may be a standard PCI Express Switch built into an x86 Motherboard.

The Host CPU 155 connects to Host Memory 160 via link 156. The Host Memory 160 may be implemented as DDR2 or DDR3 and may offer an intermediate storage location while Small Profiling Data 190 is moving to the Large Profiling Data 195 storage location on the Host-attached Hard Drive 165. The Host CPU 155 connects to the Host-attached Hard Drive 165 via link 157, which completes the connection series by which the Processor 100 may store data such as the Small Profiling Data 190 in the Hard Drive 165. The Motherboard Switches 150 attach to the Server-to-server network 170 via links 167. Links 167 and network 170 may be comprised of Ethernet or INFINIBAND networking hardware, and may allow storage of the Large Profiling Data 195 in Network-attached-storage for even longer-term storage.

Figure 2:
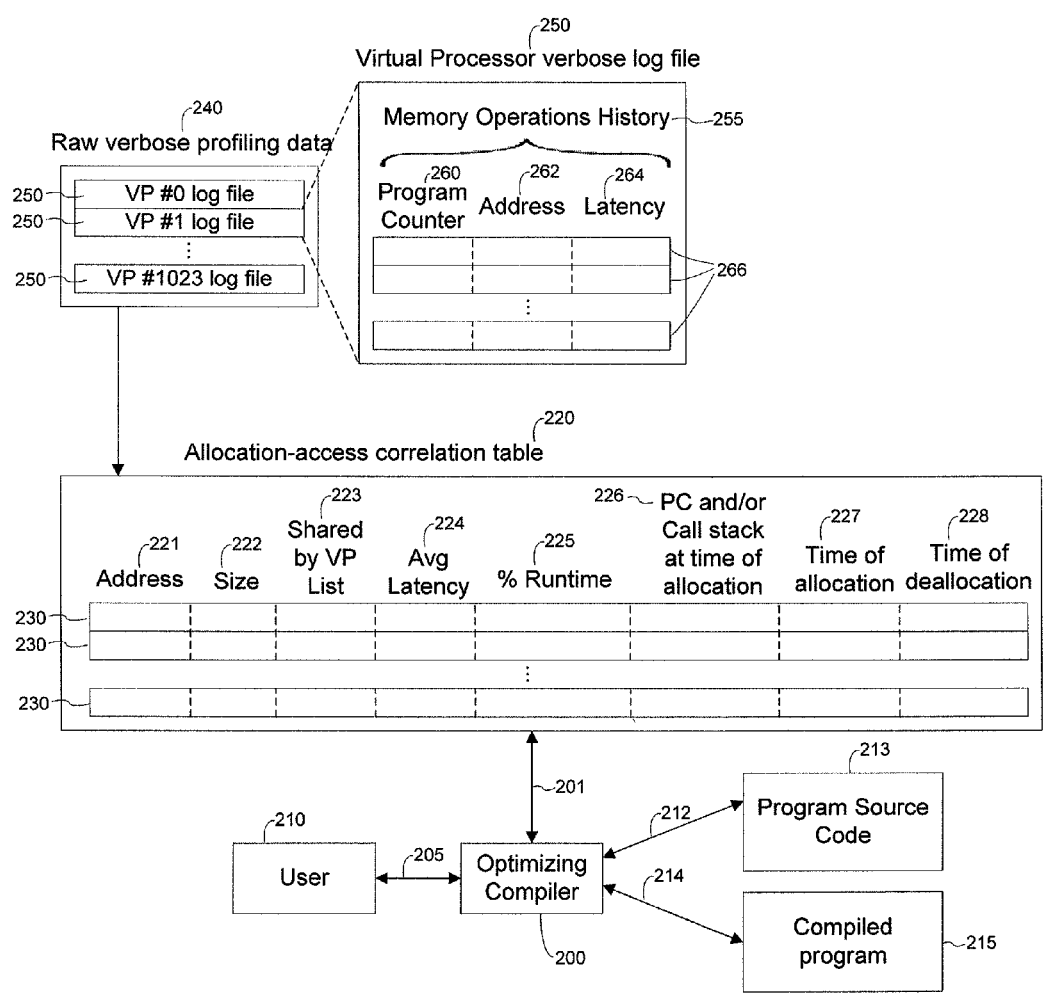
FIG. 2 is a simplified diagram of profiling data used to provide an optimizing compiler with data for improving performance in the system of FIG. 1.

FIG. 2 depicts how profiling data is used to provide an Optimizing Compiler 200 with data for improving performance. Here, the Raw verbose profiling data 240 represents data that records information for every memory operation performed by a program during execution. It is noteworthy that this data can become extremely large and greatly decrease program performance (and profiling data accuracy) through its collection. It does, however, represent ideal access to memory access detail. The Raw verbose profiling data 240 comprises multiple VP log files 250, such as VP #1 log file, which is expanded and shown in detail as the Virtual Processor verbose log file box 250. Each VP log file 250 comprises a Memory Operations History 255 with a list of memory operations 266 comprising Program Counter 260, Address 262, and Latency 264 information.

The data is used by the Optimizing Compiler in a more organized structure, whereby performance delays represented as Latency 264 are assigned to specific memory allocations 230 so that the compiler can be advised as to whether future allocations should be placed closer or further away in the network relative to the Virtual Processor making the memory request.

To this end, the Raw Verbose profiling data 240 is aggregated into the Allocation-access correlation table 220. This table 220 includes a record 230 for each allocation performed during execution of the profiled program. Each allocation record 230 comprises an Address 221 (staring address), Size 222 (number of bytes), Shared by VP List 223, which preferably lists all of the Virtual Processors that accessed the allocation, Average Latency 224 (aggregated from the various record 266 latency column 264), % Runtime 225 (also estimated from Latency 264), PC and/or Call stack at time of allocation 226 which can help the Optimizing Compiler characterize the conditions under which allocation preferences should be specified, Time of allocation 227, and Time of deallocation 228. These values help prioritize the allocation as to whether it should be moved closer or further away from the Virtual Processor that originally requests the allocation.

An allocation with a small size 222, a Shared by VP List 223 including preferably only one Virtual Processor, and a high % Runtime 225, may be processed by the Optimizing Compiler 200 via link 201. During the processing, the Optimizing Compiler may determine a certain optimization is likely to be helpful, at which point the optimization may be presented to a User 210 via link 205 for review, or it may be instituted automatically, depending on settings instituted by the User 210. If the optimization is to be put in place then the Optimizing Compiler modifies the Program Source code 213 or a metafile associated with it via link 212, which then instructs it during subsequent compilations such that the Compiled program 215 created via link 214 is of higher performance in future executions. The profiling system depicted in FIG. 2 thereby reduces the runtime of a given program, improves its response time, or attains some other improvement when the Compiled program 215 is run in the future.

Figure 3:
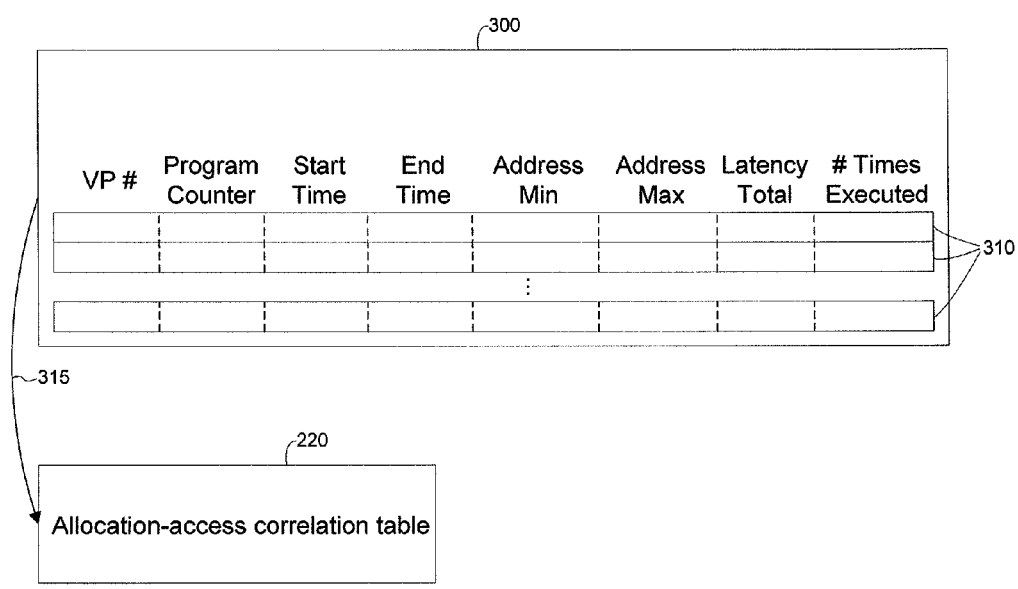
FIG. 3 is an illustration of a compressed profiling data record list in the system of FIG. 1.

FIG. 3 depicts a compressed record list 300. A new entry is preferably not created for each memory operation, but instead each memory operation preferably updates one entry 310 in the set of entries 300. The compressed record list 300 preferably requires much less storage and hurts performance less than the verbose method. The compressed record list 300 can still be converted to an Allocation-access correlation table 220 via link 315, which is useful for aiding the compiler in optimization for future program executions.

Figure 4:
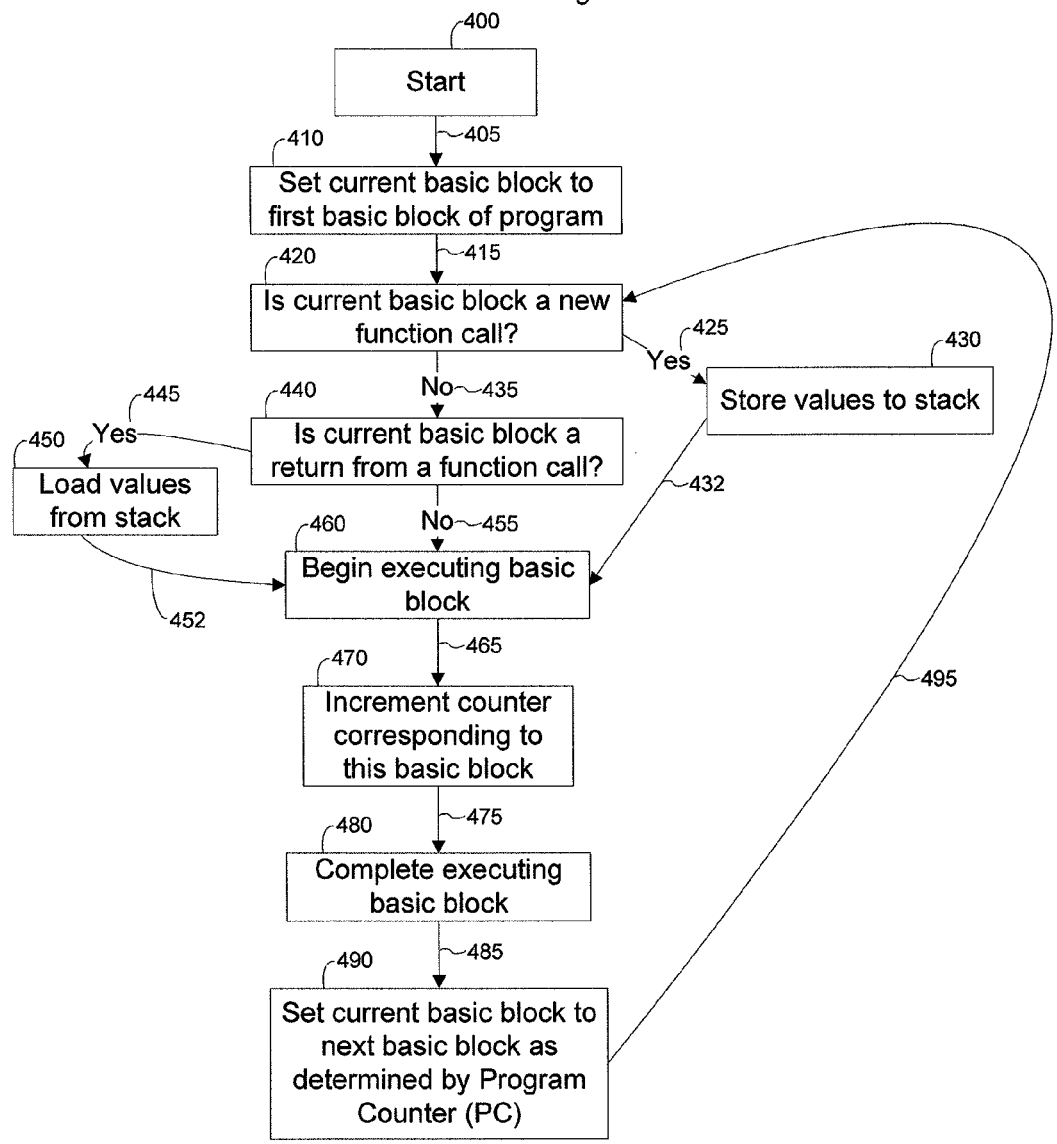
FIG. 4 is an flow chart of a method for updating counters for memory operations in the system of FIG. 1.

FIG. 4 depicts a method by which the counters for memory operations can be updated per basic block instead of per memory operation. A basic block is a section of program that starts at a single instruction and proceeds in a specific order through instructions until the last instruction of the basic block. It is preferred that no jump instructions within the basic block are allowed except at the last instruction in the basic block. It is preferred that no jump instructions into the basic block are allowed except to the first instruction in the basic block. Updating the counter on a basic block is more efficient than updating a counter for each memory operation, since the number of times each memory operation was performed can be calculated directly from the number of times the basic block in which it resides was executed.

The process of FIG. 4 begins at "Start" 400, which proceeds preferably immediately to step 410 via link 405. The "Set current basic block to first basic block of program 410 initializes the system for program execution. This step 410 proceeds then to step 420 via link 415.

The "Is current basic block a new function new function call?" step 420 tests whether a function call is beginning, and is proceeded-to via links 415 and 495. The preparation for entering and leaving a called function might be described as its own basic block, however, it is useful to describe separately since optimizations that will be described later are performed at within steps 430 and 450, and so therefore we call these out separately. If the current basic block begins a new function call then the process proceeds to step 430 via the "Yes" link 425. Otherwise, the process proceeds to step 440 via the "No" link 435.

The "Store values to stack" step 430 is proceeded-to via "Yes" link 425. In this step the values that must be stored to the stack prior to executing the code within a new function call are so moved. This may include, for example, the return Program Counter of the function, or values held in registers that must be moved to make room in those registers for variables that will be used within the called function. Step 430 proceeds to step 460 via link 432.

The "Is current basic block a return from a function call?" step 440 is proceeded-to via "No" link 435. In this step the next step is determined to be step 450 if the current basic block is coming at the end of a function call, which is proceeded to via "Yes" link 445. Otherwise step 440 proceeds via "No" link 455.

The "Load values from stack" step 450 is proceeded-to via "Yes" link 445. In this step the values previously stored to the stack are restored so that execution can proceed with the values for variables held in the positions in which the subsequent code assumes them to be. Step 450 proceeds to step 460 via link 452.

The "Begin executing basic block" step 460 is proceeded-to via "No" link 455, or links 432 or 452. In this step the current basic block set in step 410 or 490, whichever was executed most recently, begins to execute. Instructions regarding incrementing the number of times the basic block has been logged as having executed will occur at some point during the basic block. The instructions for performing this update can be scheduled so as to least disturb the execution of the other instructions, such as by utilizing slots in Very Long Instruction Words that are not being used by the non-profiling code of the basic block. This step 460 proceeds to step 470 via link 465.

The "Increment counter corresponding to this basic block" step 470 is proceeded-to via link 465. In this step the counter corresponding to the current basic block is incremented. We will examine in subsequent Figures the consequences of holding these values in-memory vs. in-register. When these values are held in-memory they must be loaded, incremented, and stored, which can significantly reduce performance during profiling and also decrease the accuracy of the profiling data (e.g. by reducing network congestion due to more slowly executing the user program). When held in-register the compiler must know which registers hold which counters, and the size of the register file must be compensated for. We will see in subsequent figures how these two difficulties are alleviated by the novel profiling system. Step 470 proceeds to step 480 via link 475.

The "Complete executing basic block" step 480 is proceeded-to via link 475 and preferably completes once all of the instructions of the basic block have finished execution.

The "Set current basic block to next basic block as determined by Program Counter (PC)" step 490 is proceeded-to via link 485. In this step the current basic block is updated based on the consequences the basic block has had on the Program Counter (e.g. by changing the program counter based on compare-and-branch instructions). The conclusion of step 490 preferably results in returning the process to the beginning of the basic block profiling execution process by returning to step 420 via link 495.

Figure 5:
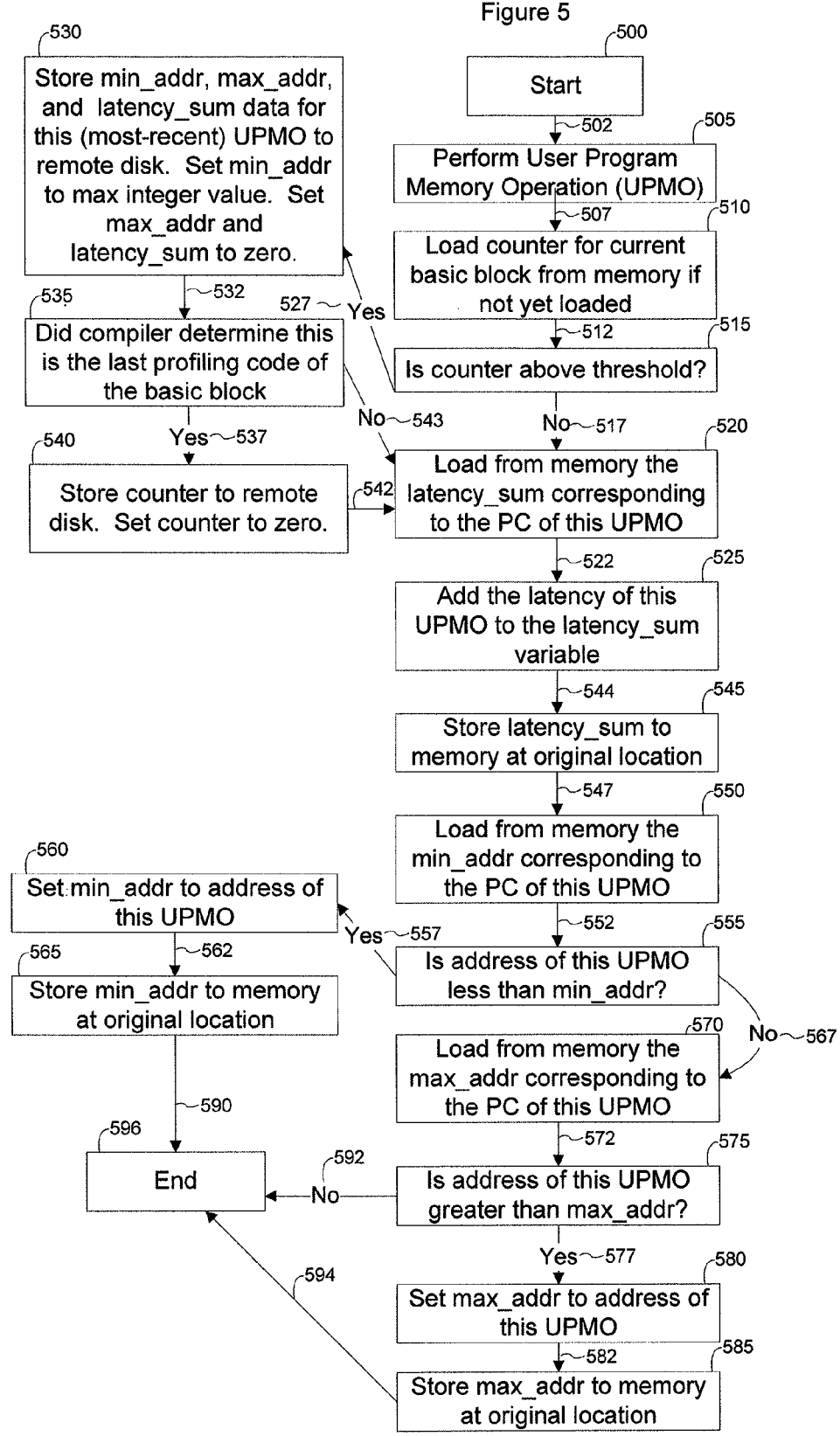
FIG. 5 is flow chart of a method by which the counters for memory operations can be updated per basic block instead of per memory operation in the system of FIG. 1.

FIG. 5 depicts how the data for the compressed table 300 may be naively collected. Subsequent figures replace much of the functionality with customized hardware so that the performance during profiling and the accuracy of the profiling data are improved. The process starts at the "Start" step 500 that proceeds to step 505 via link 502.

The "Perform User Program Memory Operation (UPMO)" step 505 is proceeded-to via link 502. In this step the UPMO is performed as normal. The address and latency of the UPMO will be available after the operation is performed.

The "Load counter for current basic block from memory if not yet loaded" step 510 is proceeded-to via link 507. In this step, if the counter for the current basic block is not yet loaded, it is loaded. The process proceeds via link 512 to step 515.

The "Is counter above threshold?" step 515 examines the counter for the current basic block in order to determine whether the data for the UPMO that is being logged should be aggregated to a more long-term storage location such as the Large Profiling Data 195 storage location of the Host-attached Hard Drive 165. If the counter has been incremented a sufficient number of times then the aggregation process begins by proceeding via "Yes" link 527 to step 530.

The "Store min_addr, max_addr, and latency_sum data for this (most-recent) UPMO to remote disk. Set min_addr to max integer value. Set max_addr and latency_sum to zero" step 530 is proceeded-to via "Yes" link 527. In this step, the compressed logging values are aggregated and reset so that segregated profiling data for a given VP and PC are available to the compiler for optimization. This step proceeds via link 532 to step 535.

The "Did compiler determine this is the last profiling code of the basic block" step 535 is proceeded-to via link 532. In this step, it is checked whether the compiler set this UPMO as the last UPMO of the basic block. If so we must also aggregate the counter for the basic block and therefore proceed via "Yes" link 537 to step 540. Otherwise the process proceeds via "No" link 543 to step 520.

The "Store counter to remote disk. Set counter to zero" step 540 is proceeded-to via "Yes" link 537. In this step, the counter for the basic block is sent to long-term storage and the local copy is reset to zero. This step 540 then proceeds to step 520 via link 542.

The "Load from memory the latency_sum corresponding to the PC of this UPMO" step 520 is proceeded to via link 542 or "No" link 517. In this step, the latency_sum value for this UPMO is loaded into a register where it can be operated upon (in a subsequent figure the method by which the novel system is sometimes able to avoid this memory operation will be shown). Once loaded this step proceeds to step 525 via link 522.

The "Add the latency of this UPMO to the latency_sum variable" step 525 is proceeded-to via link 522. Once the latency_sum variable has integrated the latency of the most-recent UPMO this step proceeds to step 545 via link 544.

The "Store latency_sum to memory at original location" step 545 stores the latency_sum variable so that it can be retrieved in the future (in a subsequent figure the method by which the novel system is sometimes able to avoid this memory operation will be shown). This step 545 then proceeds to step 550 via link 547.

The "Load from memory the min_addr corresponding to the PC of this UPMO" step 550 is proceeded-to via link 547. In this step, the min_addr variable is preferably loaded from memory so that it can be operated upon (in a subsequent figure the method by which the novel system is sometimes able to avoid this memory operation will be shown). This step 550 proceeds to step 555 via link 552.

The "Is address of this UPMO less than min_addr?" step 555 is proceeded-to via link 552. In this step a comparison is made between min_addr and the address of the most-recent UPMO and if min_addr is greater then the process proceeds to step 560 via "Yes" link 557, otherwise the process proceeds to step 570 via "No" link 567.

The "Set min_addr to address of this UPMO" step 560 is proceeded-to via "Yes" link 557. In this step, the min_addr is reset to be lower since the current address was lower than the current min_addr value. This step proceeds to step 565 via link 562.

The "Store min_addr to memory at original location" step 565 is proceeded-to via link 562. In this step, the min_addr value is stored back to memory for future use (in a subsequent figure the method by which the novel system is sometimes able to avoid this memory operation will be shown). This step proceeds to End 596 via link 590. Preferably, the max_addr does not need to be checked in this case because in general if the address is less than the min_addr then it cannot be greater than the max_addr (this is not true immediately after reset of the min_addr and max_addr values but this does not lose a significant amount of information due to aggregating addresses over many performances of the same UPMO and after a few executions of an UPMO min_addr returns to be less than max_addr).

The "Load from memory the max_addr corresponding to the PC of this UPMO" step 570 is proceeded-to via "No" link 567. It is noteworthy that this step, as well as step 520, 510, and 545 are sensitive not only to PC but also to the Virtual Processor that is running, which enables profiling data specific to each Virtual Processor to be logged separately. This step 570 proceeds to step 575 via link 572 after max_addr is loaded.

The "Is address of this UPMO greater than max_addr?" step 575 is proceeded-to via link 572. This step compares the address of the most-recent UPMO with the address stored in max_addr and if max_addr is less then the process proceeds to step 580 via link 577, otherwise it proceeds to End 596 via "No" link 592. The "Set max_addr to address of this UPMO" step 580 is proceeded-to via "Yes" link 577. In this step the max_addr is updated to be the current address of the most-recent UPMO due to its having had an address higher than max_addr. After this step max_addr holds the highest address that has been recorded for the UPMO (since values reset, and except in certain cases immediately after reset). Step 580 proceeds via link 582 to step 585.

The "Store max_addr to memory at original location" step 585 is proceeded-to via link 582 and results in the updated max_addr value being stored to memory so that it can be used in the future for log aggregating/compressing purposes (in a subsequent figure the method by which the novel system is sometimes able to avoid this memory operation will be shown). This step proceeds to the End 596 via link 594 thereby ending the process depicted in FIG. 5.

Figure 6:
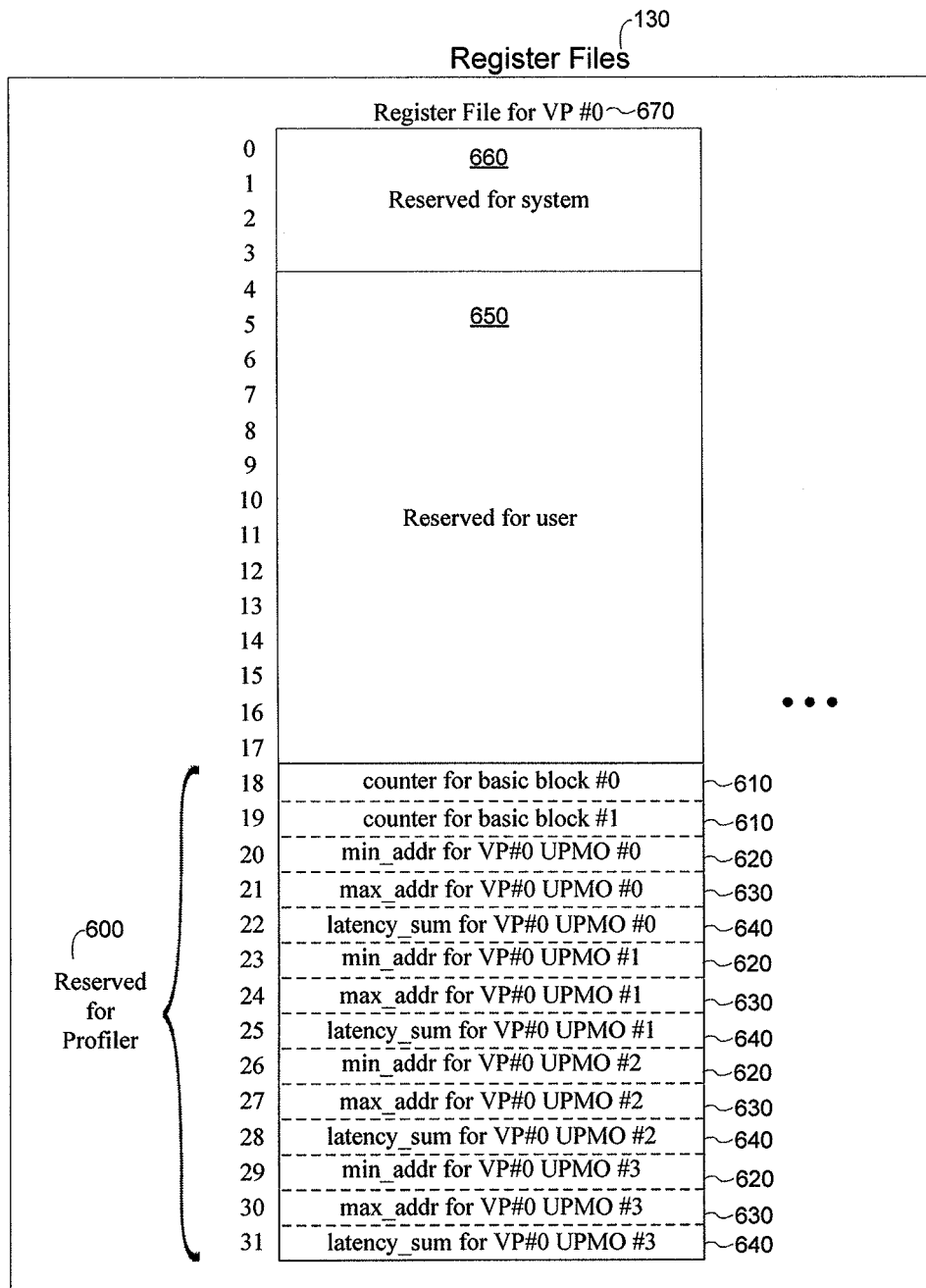
FIG. 6 is an illustration of the preferred layout of registers within a register file of a processor of the system of FIG. 1.

FIG. 6 depicts the preferred layout of registers 610-640 within a Register File for a specific VP 670. The register file 670 is from the set of Register Files 130 that service a set of Virtual Processors 135 within a processor core 110. In the example layout Registers 0-4 are Reserved for system 660, and registers 4-17 are Reserved for user 650. Registers 18-31 are Reserved for Profiler 600. Counter values for basic blocks 610 are stored in this register region 600, as are min_addr values 620, max_addr values 630, and latency_sum values 640 for a number of UPMO records for Virtual Processor #0. By storing these values in register, instead of memory, the process of aggregating UPMO characteristics to these variables becomes much faster since the retrieval and storing from/to memory steps become unnecessary.

Figure 7:
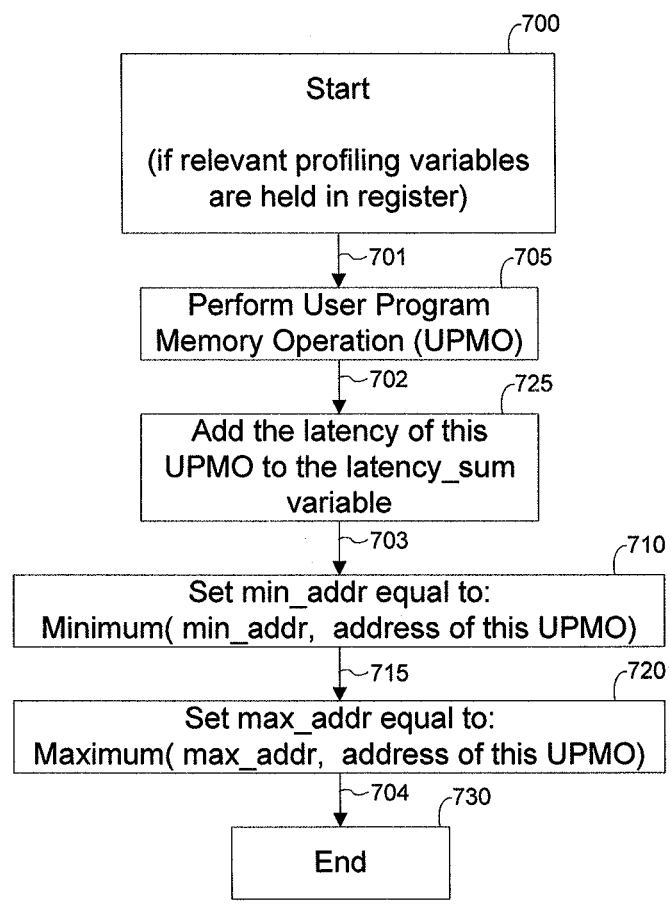
FIG. 7 is flow chart of a simplified method for determining aggregate latency and memory bounds for a segment of program code executed by the system of FIG. 1.

FIG. 7 depicts the process of FIG. 5 carried out in a more efficient manner. This process is a description of the components of the profiling system however the profiling system carries out these steps in an even more consolidated and efficient manner, using dedicated and efficient hardware, as will be shown in subsequent diagrams.

The process begins at the "Start (if relevant profiling variables held in register)" step 700. This process applies to UPMO where the variables aggregating the characteristics of said UPMO are already held in register. Step 700 proceeds to step 705 via link 701. In step 705 the UPMO is performed as described with respect to step 505 of FIG. 5 and the process then proceeds to step 725 via link 702. Step 725 proceeds as described above with respect to step 525 of FIG. 5 and proceeds to step 710 via link 703.

The "Set min_addr equal to: Minimum (min_addr, address of this UPMO)" step 710 uses a single instruction named "Minimum" to update the value of min_addr without performing any branching. Minimum instructions are common in many instruction sets and are especially efficient in architectures with high branching penalties. Although the power efficient architecture we have described as a preferred embodiment does not pay a significant penalty for branching, the advantage of using a "Minimum" instruction is still present because branching plus operating is at least two instructions and only one branch operation is allowed per Very Long Instruction Word (bundle of multiple instructions executed in a single logical cycle). The process proceeds from step 710 to step 720 via link 715.

The "Set max_addr equal to: Maximum(max_addr, address of this UPMO)" step 720 is proceeded-to via link 715. In this step the Maximum instruction is used instead of a compare-and-branch (and possibly operate depending on branch) series of instructions with similar advantages to those described for step 710. Step 720 proceeds via link 704 to End 730.

It is noteworthy that the process of FIG. 7 may be significantly faster, but only applies in the case that the aggregating log variables are held in register. Solutions employed by the profiling system that improve the ability to hold these variables in register will be described in subsequent Figures.

Figure 8:
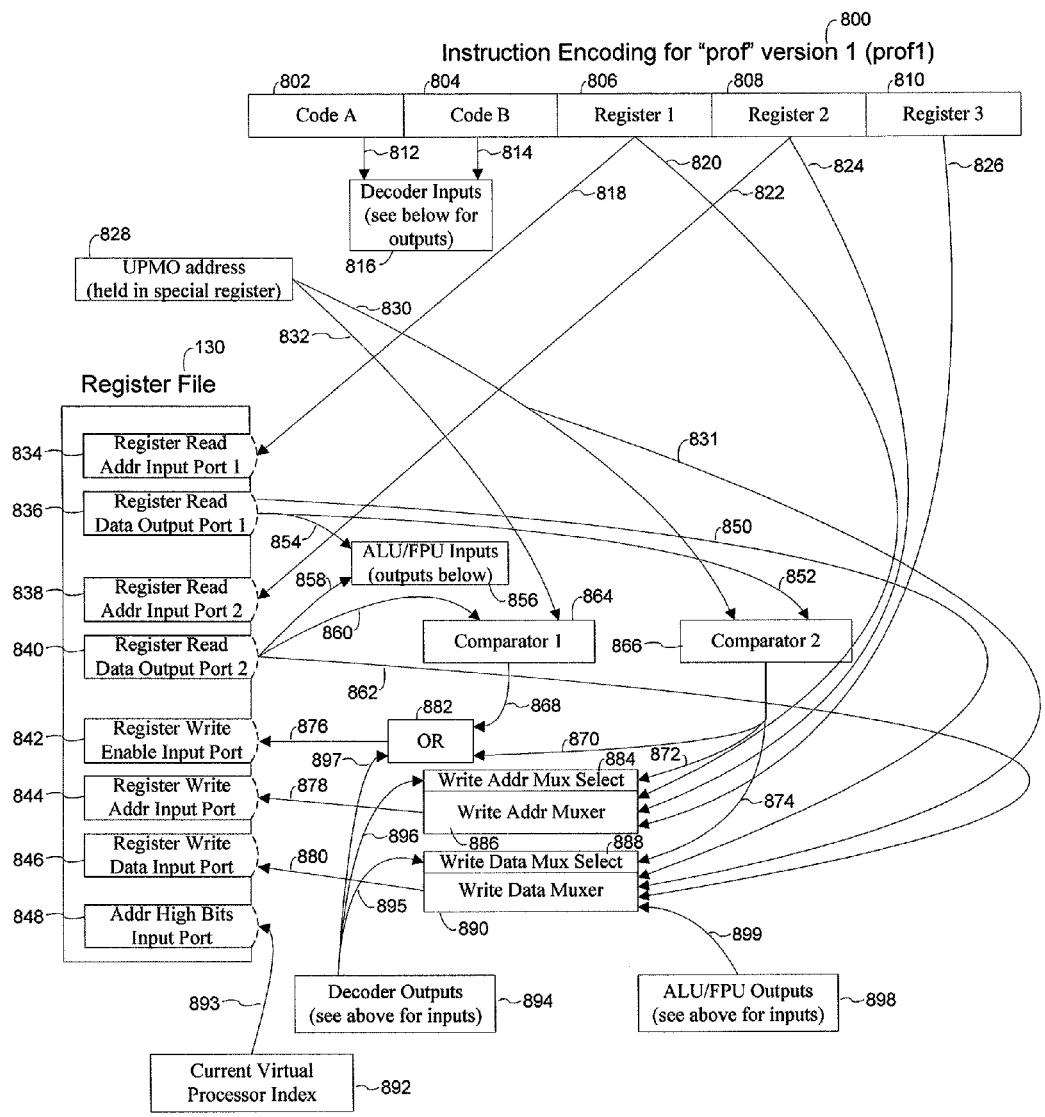
FIG. 8 is a simplified illustration of data flows during execution of a profiling instruction by a processor of the system of FIG. 1.

FIG. 8 depicts the hardware of one embodiment of the profiling system. In FIG. 8, the Instruction Encoding for an instruction named "prof1" 800 is shown. The code comprises Code A (802), Code B (804), Register 1(806), Register 2 (808), and Register 3 (810). Connections used by typical instructions are shown, as well as the connections required to carry out the prof1 instruction. We can see that Register 1(806) feeds Register Read Addr Input Port (834) via 818 and is an option 820 for the Write Addr Muxer (886) to select as output 878. Register 2 (808) feeds Register Read Addr Input Port 2 (838) via 822 and is another option 824 for the Write Addr Muxer (886) to select as output 878. Register 3 (810) is unused by the prof1 instruction, however other instructions typically use it (as will a subsequent version of the prof instruction) as the Write Addr for the register file 130, and therefore it feeds Write Addr Muxer 886 via 826.

Output from the Register File's 130 Register Read Data Output Port 1 (836) is sent to the "ALU/FPU Inputs (outputs below)" unit 856 via 854, to Comparator 2 (866) via 852, and to the Write Data Muxer (890) via 850.

Output from the Register File's 130 Register Read Data Output Port 2 (840) is sent to the "ALU/FPU Inputs (outputs below)" unit 856 via 858, to Comparator 1 (864) via 860, and to the Write Data Muxer 890 via 862. Comparator 1 (864) operates during the prof1 instruction and determines whether the min_addr (data fetched form the Register File 130 at the address designated by Register 2 (808) is greater than the UPMO address (held in special register 828), which is provided to Comparator 1 864 via 832. If greater, the output 868 sent to OR unit 882 is 1, otherwise it is 0 (this results in enabling the Register File by affecting the Register Write Enable Input Port 842 via link 876).

Comparator 2 preferably compares the UPMO address (held in special register) 828 value provided via input 830 with the max_addr (designated by data read from the Register File 130 at the address designated by Register 1 (806)) and if max_addr is less then the output of Comparator 2 is 1, otherwise it is 0. When true, this causes the output 870 to enable the Register Write Enable Input Port 842 via passing of the "1" signal through the OR 882 unit and link 876.

The "Decoder Inputs (see below for outputs)" unit 816 receives Code A 802 via 812 and Code B 804 via 814. When the Decoder detects that Code A 802 and Code B 804 match the codes for the "prof" instruction then the "Decoder Outputs (see above for inputs)" unit 894 sends its outputs 895, 896, 897 to the Write Data Mux Select 888, Write Addr Mux Select 884, and OR 882 units respectively in order to send the UPMO address 828 to through to the Register Write Data Input Port 846 via 831 and 880 in the case that the Comparator indicates that the value should be passed through. The "ALU/FPU Outputs (see above for inputs)" 898 provides the Write Data Muxer 890 with the standard data it will use for other instructions via link 899. It is preferred that the Current Virtual Processor Index 892 determines which register file should be used by commanding the Addr High Bits Input Port 848 via 893.

The hardware carries out the operation of both min and max in a single instruction. The UPMO address 828 is passed to the Register Write Data Input Port 846 if the instruction is the prof1 800 instruction, as determined by the Decoder (816, 894). The Register Write Enable Input Port 842 is enabled according to the Decoder if the instruction is not a prof1 instruction. If the instruction is the prof1 instruction then the Register Write Enable Input Port 842 is set if Comparator 1 finds min_addr is greater than UPMO address (828) or if Comparator 2 finds that max_addr is less than UPMO address. The Register Write Addr Input Port 844 is set to the register address of max_addr (Register 1, 806) if Comparator 2 found that the "Maximum" instruction should be carried out, otherwise it is set to min_addr (Register 2, 808) to carry out the Minimum Instruction. Maximum or Minimum will only be carried out if in fact one or the other should be implemented, as determined by the OR unit 882.

The prof1 instruction, which is one embodiment of the profiling system, thereby implements both Minimum and Maximum in a single instruction, retrieves UPMO address 828 from a special register, and accomplishes both Minimum and Maximum using just two general purpose register read ports 834-840 and one register write port 842-848.

Figure 9:
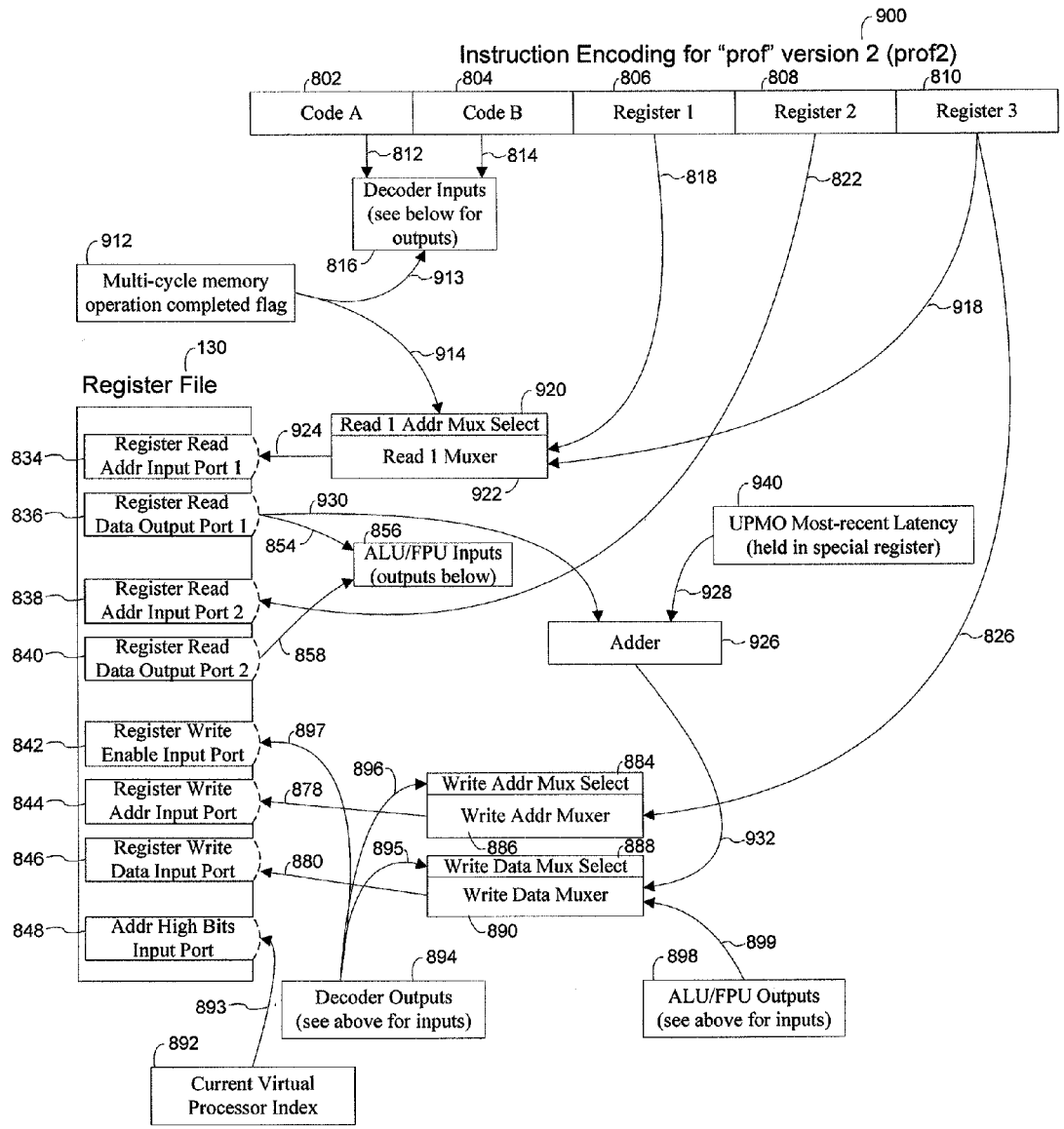
FIG. 9 is a simplified illustration of data flows during execution of another profiling instruction by a processor of the system of FIG. 1.

FIG. 9 depicts hardware implementing the functionality of the prof2 900 instruction not included in the prof1 instruction 800. Here, the Multi-cycle memory operation completed flag 912 indicates to the Decoder 816 and Read 1 Addr Mux Select 920 via 913 and 914 links respectively whether the current cycle is the last cycle of a memory operation that has taken more than 1 cycle. In this case, the latency must be added, but in cases where the operation took only 1 cycle, the latency can be inferred from the counter of the basic block and does not need to be added. In cases where the latency should be added, the register address of the latency_sum variable is held in Register 3 (810) and transmitted to Register Read Addr Input Port 1(834) via Read 1 Muxer components 920, 922, 924, which receive Register 3 (810) via 918. The adder 926 adds the Most-recent Latency 940 received via 928 with the latency_sum received via 930. The Decoder takes into account the Multi-cycle memory operation completed flag 912 along with the codes 802, 804 and outputs via unit 894 whether to forward the result of the adder 932 to the Register Write Data Input Port 846.

The prof2 900 instruction implements the functionality of prof1 800 in the case that the Codes 802, 804 indicate it is the prof2 900 instruction and the Multi-cycle memory operation completed flag 912 is "0". The prof2 instruction 900 carries out the functionality of summing for the latency_sum variable in the case that the codes 802, 804 match prof2 and the Multi-cycle memory operation completed flag 912 is "1". In this way the functionality of Minimum, Maximum, and latency_sum are carried out by a single instruction that is a very important way in which the novel profiling system achieves good performance.

It is noteworthy that the profiling system works well in the always-on mode described in the previous figures and also in the "sampling mode" that is often used in modern architectures to prevent the profiler from inhibiting performance too much. The profiling system allows for a greater number of samples to be taken before the performance of the program suffers significantly, therefore the novel profiling system has an advantage in both the always-on mode and the sampling mode.

It is also noteworthy that the granularity of the profiling system can be increased or decreased by aggregating the logging variables and resetting their values during function (430) calls and function returns (450), thereby improving upon the default granularity of Virtual Processor and Program Counter specificity so that function call stack specificity can be achieved.

It is furthermore noteworthy that the storage of logging variables to longer term storage implemented with branching instruction 515 within the profiling code can be implemented with a timer interrupt mechanism thereby reducing or eliminating the need to integrate said branching into the novel profiling system prof instructions.

Figure 10:
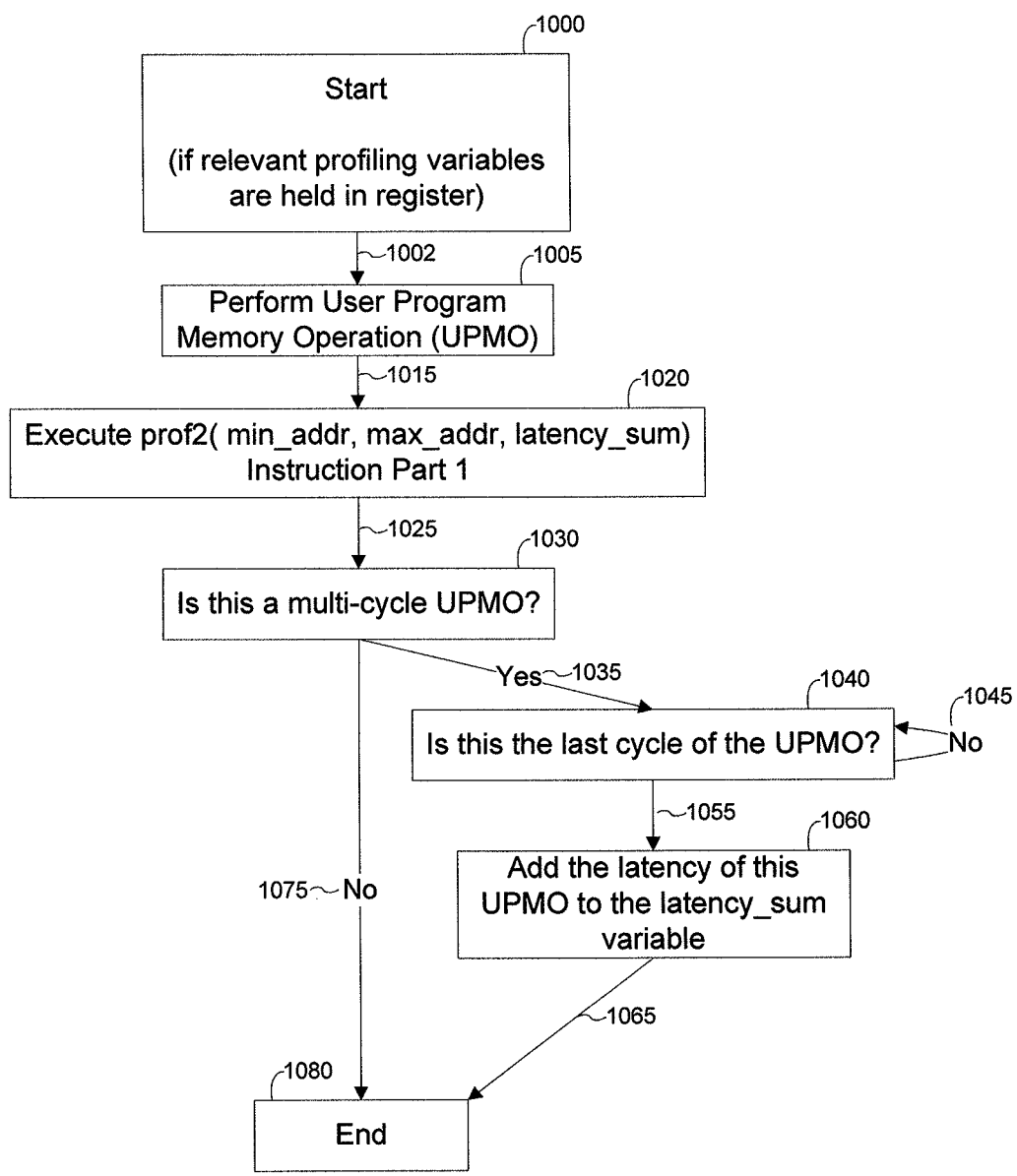
FIG. 10 is a flow chart of a process for performing a profiling instruction of a processor of the system of FIG. 1.

FIG. 10 depicts the process by which prof2 is carried out. The "Start (if relevant profiling variables are held in register)" step 1000 proceeds via 1002 to "Perform UPMO" 1005 after which the process proceeds to step 1020 via 1015.

The "Execute prof2(min_addr, max_addr, latency_sum) Instruction Part 1" step 1020 carries out the process depicted in FIG. 8 (Minimum and Maximum instructions combined). The second part of this instruction (summing of latency_sum) is implemented in steps 1030-1060 in FIG. 10. Step 1020 proceeds to step 1030 via 1025.

The "Is this a multi-cycle UPMO?" step 1030 proceeds to step 1040 via "Yes" link 1035 if the UPMO is taking more than one cycle (thereby requiring latency_sum adding, since the counter for the basic block will not be an adequate recorder of the latency in this case). Otherwise step 1030 proceeds to End 1080 via "No" link 1075.

The "Is this the last cycle of the UPMO" step 1040 proceeds via "No" link 1045 back to itself until the last cycle of the UPMO, at which point the process proceeds to step 1060 via 1055. The "Add the latency of this UPMO to the latency_sum variable" step 1060 is then performed after which the process proceeds to End 1080 via 1065.

Figure 11:
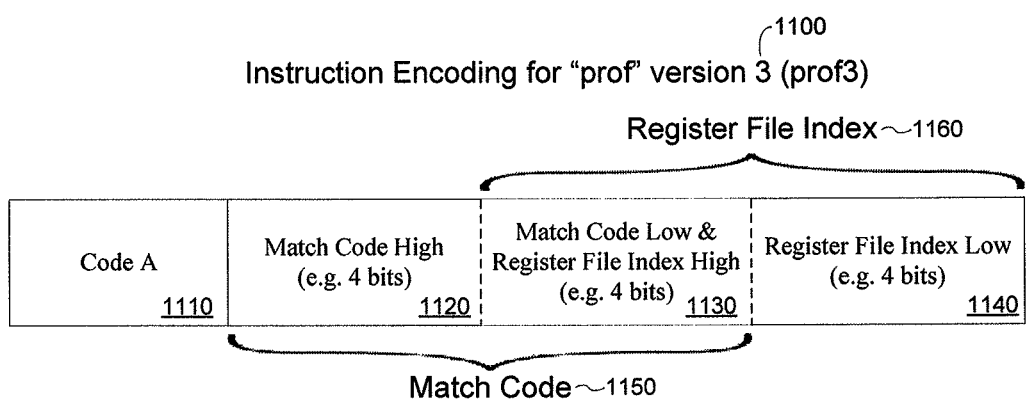
FIG. 11 is an illustration of an instruction encoding of a profiling instruction of a processor of the system of FIG. 1.

FIG. 11 depicts a new instruction encoding 1100 for the prof3 instruction, which will enable the Register Files 130 to act as a 1-way cache for the purposes of profiling variables. The match process of the 1-way cache is integrated by storing the cache tag within the data held in register, and the tag to match within the instruction code of the instruction utilizing the profiling variables. Prof3 furthermore throws an exception in the case that the tags do not match, thereby allowing software handling of logical cache misses. Finally, prof3 preferably allows full use of the Register Files 130 registers by a single Virtual Processor 137 so that, in addition with Virtual Processor mode bits controlling whether profiling is activated (and therefore whether prof instructions do anything) one or just a few Virtual Processors can utilize a larger set of register resources and increase the number of profiling variables that can be quickly accessed in the register file.

The instruction encoding 1100 reduces the Code portion of the instruction encoding to just Code A 1110 (a common technique when additional bits in the instruction encoding are needed for other purposes, such as in immediate instructions). The Match Code 1150 is held in fields 1120 and 1130. The Register File Index 1160, which can index Register Files 132 assigned to different Virtual Processors 135 and therefore preferably requires additional bits to specify a specific register, utilizes fields 1130 and 1140.

Figure 12:
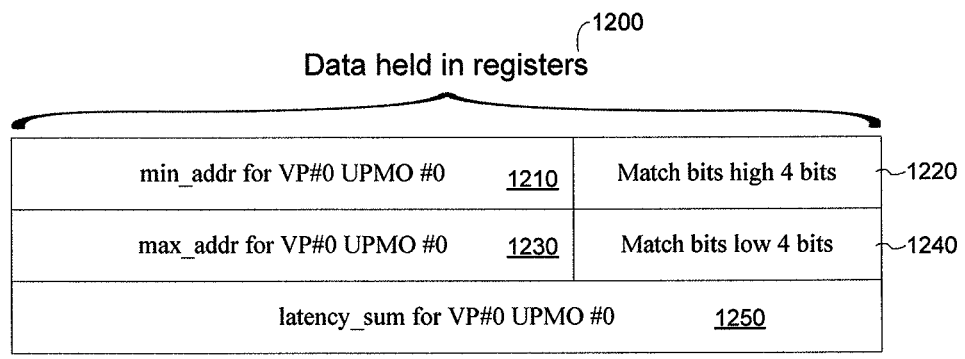
FIG. 12 depicts register memory allocation for storage of match bits for performing a profiling instruction of a processor of the system of FIG. 1.

FIG. 12 depicts how the Match bits 1220, 1240 are held in registers 1200. We see that most of the bits of the register comprising 1210 and 1220 are dedicated to the min_addr variable, and only a few of the least significant bits store part of the match bits. The rest of the match bits are stored in 1240 adjacent to the max_addr variable. The size of the match bits fields limits the specificity of the min_addr and max_addr variables. In the case that 4 bits are dedicated from min_addr, and 4 from max_addr, then the min_addr and max_addr variables can only specify addresses rounded (truncated) to intervals of 16 bytes. The latency_sum variable is stored in 1250. The regularity of the layout allows a single register designation to designate the location of all 5 (1210-1250) variables. The register specified by the Register File Index 1160 stores the index of the register holding the min_addr 1210 and Match bits high 1220, and the locations of the other fields are inferred from the regular layout that is expected by the prof 3 instruction. This regularity of layout saves bits in the instruction encoding.

Figure 13:
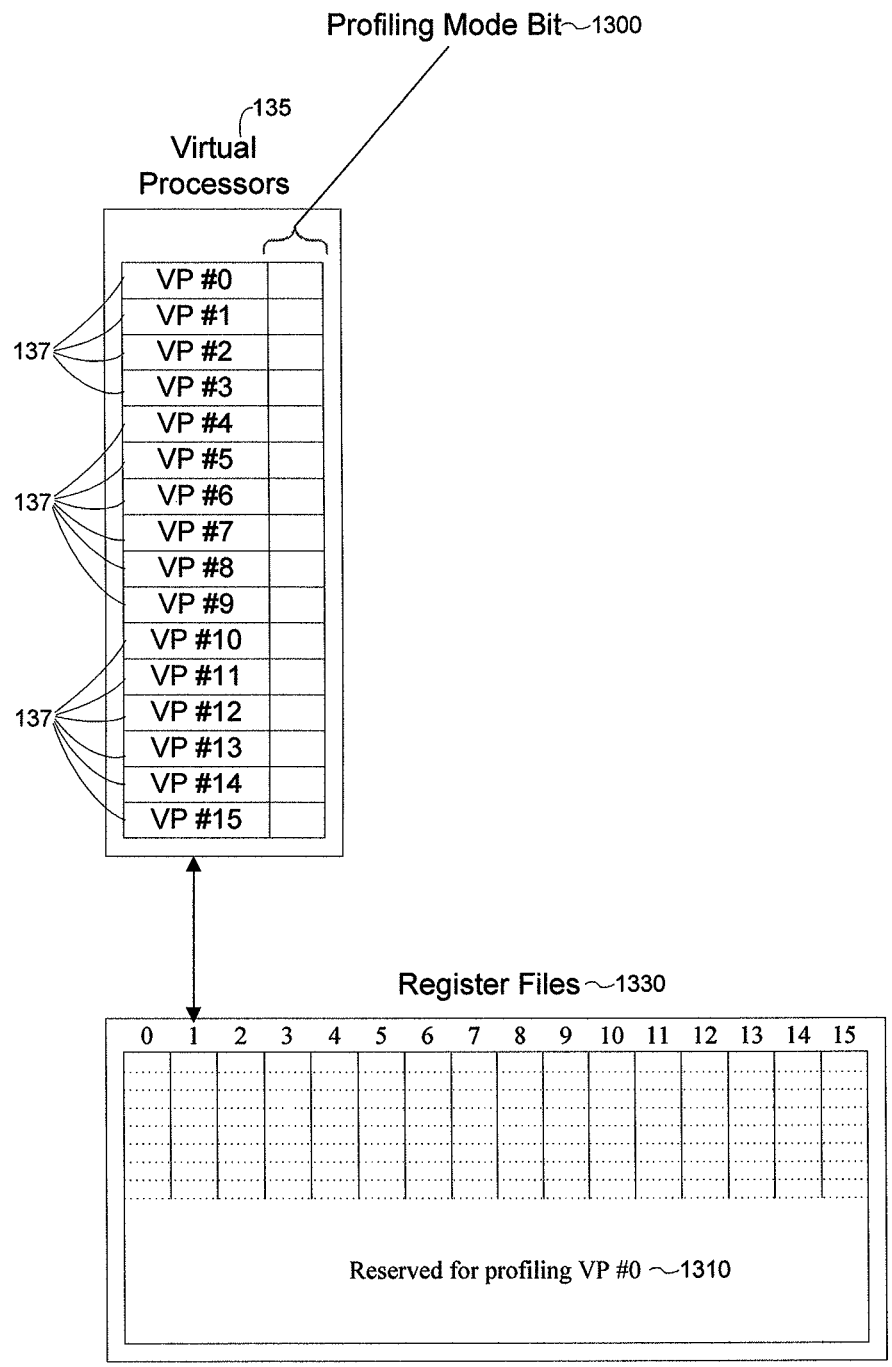
FIG. 13 is an illustration of a profiling mode bit in the set of virtual processors of a processor of the system of FIG. 1.

FIG. 13 depicts the Profiling Mode Bit 1300 which can be set individually for each Virtual Processor 136 in the set of Virtual Processors 135. When set to 0, this bit 1300 disables any effects of the prof instructions, thereby disabling profiling for the virtual processor 137. When set to 1, this bit 1300 enables the prof instructions, thereby enabling profiling for the virtual processor 137.

The "Reserved for profiling VP #0" region 1310 of the Register Files 130 shows how an area of the Register Files that is quite large, 16 times larger than what might be dedicated by a single virtual processor 132, can be dedicated to a single virtual processor for the purposes of profiling. In this way, one virtual processor can be assigned a very large set of registers in which to store its profiling variables, thereby improving the performance of the profiling at the expense of collecting data for all virtual processors. The compiler may enable or disable this mode of profiling depending on how the compiler selects to investigate the performance surface of possible optimizations that might be applied to the user program.

An added benefit of the Profiling Mode Bit is that all Virtual Processors, whether profiling or not, attempt to execute the profiling instructions, and therefore the performance of the Virtual Processors remains the same, thereby improving the accuracy of the profiling data in the case that threads synchronize with each other during execution of the user program.

Figure 14:
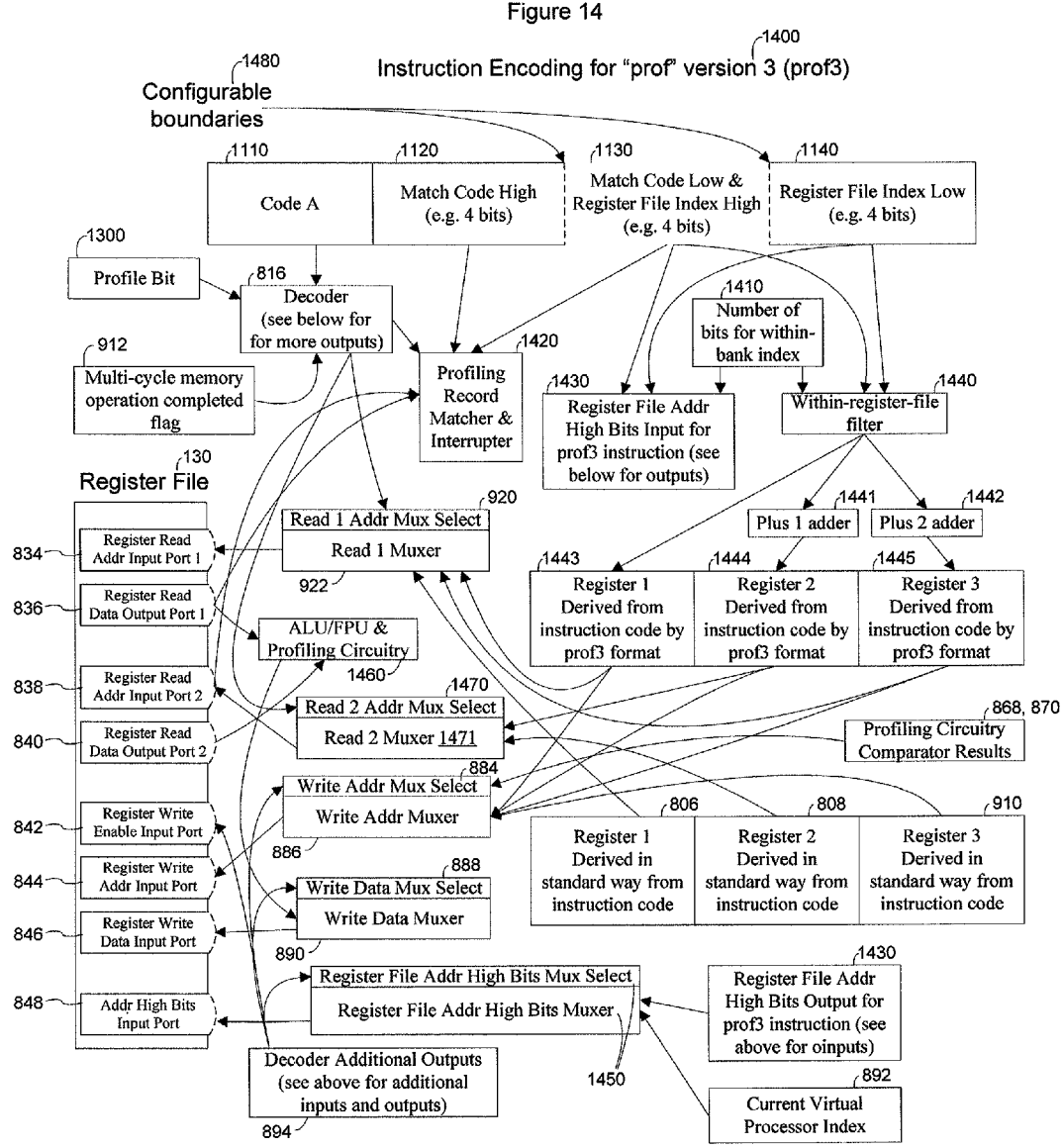
FIG. 14 is a simplified illustration of data flows during execution of another profiling instruction by a processor of the system of FIG. 1.

FIG. 14 depicts hardware capable of carrying out the functionality added to the prof instruction by prof3 1400. The Number of bits for within-bank index 1410 is configurable 1480 and modifies the "Register File Addr High Bits Input for prof3 instruction (see below for outputs)" unit 1430 as well as the within-register-file filter 1440. The filter 1440 sets the effective Register 1 1443, Register 2 1444 (derived from 1441), and Register 3 1445 (derived from 1442). The ALU/FPU circuitry 856 has been integrated with prof1 and prof2 circuitry in the unit 1460.

The unit carrying out match verification and, in the event that a mismatch is found causing an interrupt, is the "Profiling Record Matcher & Interrupter" unit 1420. Unit 1430 has its outputs integrated by unit 1450 the register file high bits muxer. The read 2 muxer 1471 is shown which integrates normal Read 2 register index 808 and prof3-based Register address 1444 and sends output to Register Read Addr Input Port 2 based on the selection determined by the Read 2 Addr Mux Select 1470 which selects based on input received from Decoder 816.

These units implement the reservation register region capability 1310, the mode bit 1300, as well as the matching capability 1420, and instruction code field register address repurposing 1200.

Figure 15:
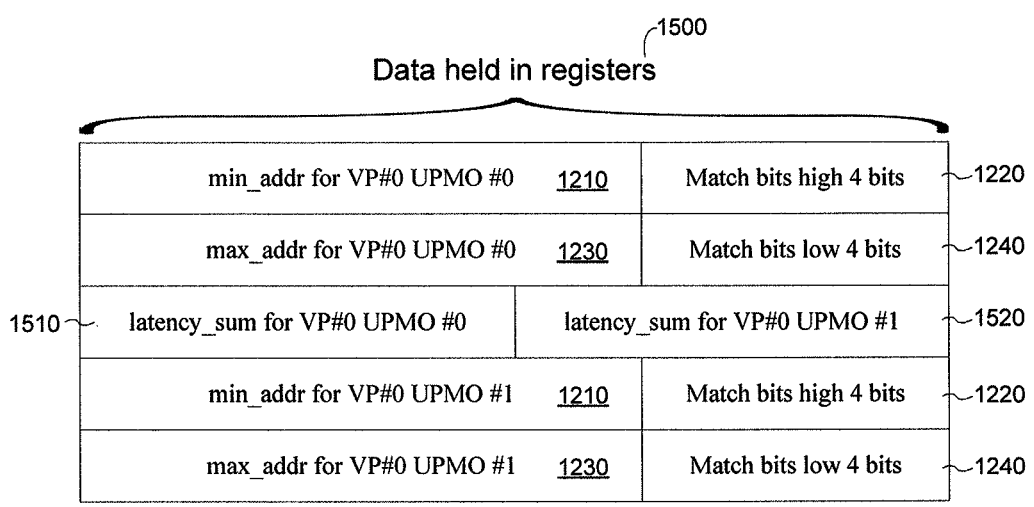
FIG. 15 depicts register memory allocation for storage of match bits and latency values for performing a profiling instruction of a processor of the system of FIG. 1.

FIG. 15 depicts a space saving mechanism of the novel profiling system that allows multiple latency_sum values to be stored in the same register. Because of the generally slow accrual of latency_sum values it is possible to throw an interrupt when they grow out of bounds, and for such interrupts to not significantly affect performance. We see the new format 1500 specifies pairs of min_addr, max_addr, match bits 1220, 1240 and latency sums 1510, 1520 so that two sets of these variables occupy only 5 registers instead of 6. The format is implemented by deriving whether an entry is the first or second of a pair based on required alignment of the entry pairs in the register file. For certain designations of the min_addr (e.g. a designation divisible by 5) the designation identifies it as a first in a pair, and the alternative designation of min_addr (e.g. a designation not divisible by 5) the designation identifies it as the second in the pair.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A system having a processor comprising:
   circuitry for implementing an instruction set of the processor; and
   circuitry for implementing a register file;
   wherein the register file provides operand inputs for instructions of the instruction set;
   wherein the instruction set comprises a profiling instruction that receives a first input and a second input from the register file and a third input either from the register file or from a special register whose value was set by a previous instruction;
   wherein the profiling instruction further causes the processor to:
   add a number of cycles required for a memory read operation to an accumulating value of the total amount of waiting that a given memory operation in the program code is responsible for incurring, wherein the number of cycles is either the actual number of cycles or the actual number of cycles minus one; and
   wherein the accumulating value is only added-to in the case that the memory read operation requires two or more cycles; wherein the profiling instruction is executed immediately after initiation of the memory operation instruction; and wherein the output to the register file that updates the accumulating value occurs during the waiting cycle in which the memory read data returns so as to not require an additional output to the register file during memory read operations that take only one cycle.

2. The system of claim 1 wherein the first, second, and third inputs represent memory addresses and the previous instruction was a memory operation.

3. The system of claim 1 wherein the third input is provided from a special register storing the address of the most recent memory access of executing program code.

4. The system of claim 1 wherein the profiling instruction causes the processor to perform a bounds update, wherein:
   if the third input is less than the first input, the value of the first input held in the register file will be overwritten with the value of the third input as the output of the instruction;

if the third input is not less than the first input and is greater than the second input, the value of the second input held in the register file will be overwritten with the value of the third input as the output of the instruction; and if the third input is neither less than the first input nor greater than the second input, neither the first input nor the second input are overwritten by the output of the instruction.

5. The system of claim 4 further comprising a storage device for storing bounds information generated at least in part by the operation of the profiling instruction.

6. The system of claim 5 wherein the bandwidth between the processor and the storage device is not sufficient to log the address of every memory access, but wherein the bandwidth between the processor and the storage device is sufficient to intermittently log the bounds values collected by the profiling instruction.

7. The system of claim 1 wherein the encoding of the profiling instruction stores the register file address of the third input in an instruction field that is used by other instructions of the instruction set to designate an output register; and wherein the third input is obtained from the register file at the address designated by the profiling instruction.

8. The system of claim 1 wherein the profiling instruction causes the processor to:

perform a check as to whether the first and second input operands are equal to a special initialization value; and responsive to a determination that the first and second input operands are equal to a special initialization value, throw an exception.

9. The system of claim 8 wherein the throwing of exception causes the execution of software program code to set the value of the first and second inputs in the register file to the value of the third input.

10. The system of claim 1 wherein the profiling instruction causes an exception to be thrown when the accumulating value total exceeds a threshold; wherein the exception handling code stores the accumulating value to a larger storage location outside the register file; and wherein the accumulating value is re-initialized so as to begin accumulating anew.

11. A computer implemented method of profiling a block of program code comprising, for each execution of a user memory operation in each of a plurality of executions of the block of program code:

determining a memory address associated with execution of the user memory operation;

comparing the determined memory address with a minimum address or a maximum address associated with the block of program code;

responsive to a determination that the determined memory address is below the minimum address associated with the block of program code or above the maximum address associated with the block of program code, updating the minimum address or maximum address, respectively;

adding a latency value for the user memory operation to a sum of latency values associated with the block of program code; and after all executions of the plurality of executions of the block of program code, comparing a metric derived from the sum of latency values associated with the block of program code to a threshold; and responsive at least to the metric derived from the sum of latency values associated with the block of program code exceeding the threshold, generating a proposed optimization of the block of program code.

12. The method of claim 11 further comprising:

determining an average latency for at least one user memory operation of the block of program code.

13. The method of claim 11 further comprising:

determining a memory allocation instruction corresponding to memory locations spanning the minimum and maximum addresses.

14. The method of claim 11 wherein the sum of latency values associated with the block of program code is stored in a register of the processor.

15. The method of claim 11 wherein the minimum address associated with the block of program code and maximum address associated with the block of program code are stored in registers of the processor.

16. The method of claim 11 wherein comparing the determined memory address with a minimum address or a maximum address associated with the block of program code is performed using a profiling instruction of the instruction set of the processor.

17. The method of claim 11 wherein the proposed optimization of the block of program code comprises allocating memory for a data structure accessed by the block of program code in a memory more local to the processor.

18. The method of claim 11 wherein the metric derived from the sum of latency values associated with the block of program code is an average latency.

* * * * *